United States Patent Office 3,745,159
Patented July 10, 1973

3,745,159
2-CARBOXY - 1 - BENZALIMINO - 1,5-DIMETHYL-2-PHENYL-3-PYRAZOLONE, ORGANIC AND INORGANIC DERIVATIVES THEREOF AND PROCESS FOR PRODUCING THE SAME
Alberto Reiner, Como, Italy, assignor to Laboratori Biochimici Fargal-Pharmasiat S.p.A., Rome, Italy
No Drawing. Filed Feb. 28, 1969, Ser. No. 803,401
Claims priority, application Italy, Feb. 28, 1968, 35,160/68
Int. Cl. C07d 49/14
U.S. Cl. 260—240 G      1 Claim

ABSTRACT OF THE DISCLOSURE 2-carboxy-1-benzalimino-1,5-dimethyl - 2 - phenyl-3-pyrazolone and alkali and alkali earth salts thereof are prepared by the process of the invention.

---

The present invention relates 2-carboxy-1-benzalimino-1,5-dimethyl-2-phenyl-3-pyrazolone, organic and inorganic derivatives thereof and the process for producing the same.

The 2-carboxy-1-benzalimino-1,5-dimethyl-2-phenyl-3-pyrazolone has the following general formula:

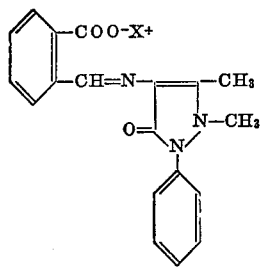

(I)

wherein $X^+$ is $H^+$.

The principal object of the present invention is the production of organic and inorganic derivatives of the above stated compounds of Formula I.

The organic derivatives are compounds represented by the Formula I wherein:

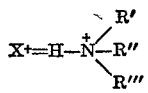

$R'$, $R''$, $R'''$ represents for each individual compound by the following groups of radicals:

$R'= -H$
$R''= -CH_3$

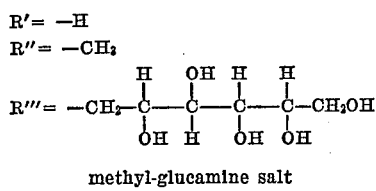

(II)

methyl-glucamine salt $R'= -C_2H_5$
$R''= -C_2H_5$
$R'''= -CH_2-CH_2-OH$     (III)

diethylaminoethanol salt $R'= -CH_2-CH_2-OH$
$R''= -CH_2-CH_2OH$
$R'''= -H$     (IV)

diethanolamine salt $R'= -C_2H_5$
$R''= -C_2H_5$
$R'''= -H$     (V)

diethylamine salt $R'= -CH_3$
$R''= -CH_3$
$R'''= -CH_2-CH_2-OH$     (VI)

dimethylaminoethanol salt.

$R'=-H$
$R''=-CH_3$

The inorganic derivatives referred to in the present invention are some alkali and alkali earth salts of the compound of the Formula I and in particular the Na, K, Ca and Mg salts.

With reference to the above-mentioned Formula I, it is pointed out that the condensation of 4-amino-1,5-dimethyl-2-phenyl-3-pyrazolone with 2-carboxy-1-benzaldehyde yields a grouping characterized by a low toxicity pharmacological activity, with a specific antiphlogistic, anti-inflammatori and anti-algetic action.

The 2-carboxy-1-benzalimino-1,5-dimethyl-2-phenyl-3-pyrazolone (Formula I, $X^+=H^+$) appears as bright yellow colored microcrystals, hardly soluble in water, even in hot water, and in alcohol.

When the substitution of the $H^+$ ion of the Formula I is carried out with organic products having a basic character, owing to the presence of a substituted amino group, as from the example previously illustrated in Formulas II and VI, the quaternization of the nitrogen of such compounds takes place and the respective organic salts are obtained, which salts are characterized by excellent water solubility, which property makes the compounds ideally suitable to be administered by the parenteral route.

It is a specific object of the present invention to provide a method for the preparation of 2-carboxy-1-benzalimino-1,5-dimethyl - 2 - phenyl - 3 - pyrazolone (Formula I, $X^+=H^+$), comprising the steps of hot mixing 2-carboxy-1-benzaldehyde in an alcoholic solution with 4-amino-1,5-dimethyl-2-phenyl-3-pyrazolone in an ethanol solution, allowing the mass to hot react under stirring, until the 2-carboxy-1-benzalimino-1,5-dimethyl-2-phenyl - 3 - pyrazolone crystalizes out, cooling and filtering the product obtained.

Moreover the invention comprises the production of alkali and alkali earth salts of the compound of the Formula I, which comprises preparing a solution of 2-carboxy-1-benzalimino-1,5-dimethyl-2-phenyl - 3 - pyrazolone and of an alkali or alkali earth salt in distilled water, concentrating said solution under vacuum until a 70% solution of 2-carboxy-1-benzalimino-1,5-dimethyl-2-phenyl-3-pyrazolone is obtained as an alkali or alkali earth salt.

The present invention also provides a process for preparing the methylglucamine salt of the 2-carboxy-1-benzalimino - 1,5 - dimethyl - 2 - phenyl-3-pyrazolone of the Formula I which comprises hot mixing under stirring 2-carboxy - 1 - benzalimino - 1,5 - dimethyl-2-phenyl - 3 - pyrazolone in an alcoholic solution with methylglucamine, allowing the mass to lie undisturbed for 1 hour at 45° C., hot filtering, cooling the solution from which by crystallization the 2-carboxy - 1 - benzalimino - 1,5 - dimethyl - 2 - phenyl - 3 - pyrazolone precipitates out as methylglucamine salt, filtering and drying under vacuum the product obtained.

In the following examples, the preparation of 2-carboxy - 1 - benzalimino - 1,5 - dimethyl - 2 - phenyl - 3 - pyrazolone as well as the soluble inorganic and organic derivatives thereof is described. Such examples are presented only to illustrate the invention and are not to be construed as limiting the scope thereof.

EXAMPLE 1

Preparation of 2-carboxy-1-benzalimino-1,5-dimethyl-2-phenyl-3-pyrazolone, Formula I, [X+]=[H+]

To prepare the above compound, the procedure is as follows:

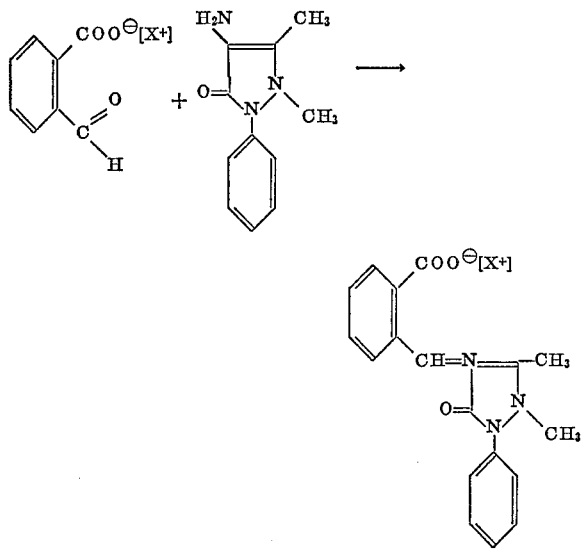

Specifically in a one liter flask having four side necks provided with a reflux condenser, a dropping funnel, a thermometer and a stirrer, 24 g. of 2-carboxy-1-benzaldehyde are introduced which are dissolved in 150 ml. of 95 ethyl alcohol under stirring and by refluxing the solution. To said hot solution a solution of 32.4 g. of 4-amino - 1,5 - dimethyl - 2 - phenyl - 3 - pyrazolone dissolved in 150 ml. of ethyl alcohol is added; the dropping of such a solution being carried out slowly, while stirring, in order to be able to maintain the alcohol refluxing temperature.

After completion of the addition of the 4-amino-1,5-dimethyl - 2 - phenyl - 3 - pyrazolone solution, the mass is allowed to hot react under stirring until the desired product appears to be crystallized as yellow colored microcrystals. The whole is left undisturbed for 24 hours in the cold, the material is then filtered on a Büchner funnel, and recrystallized, obtaining thereby 32 g. of the product sought which has a M.P.=184°–185°.

Such a condensation can be carried out with good results also in a glacial acetic acid medium.

At the percentage analysis the 2-carboxy-1-benzalimino-1,5 - dimethyl - 2 - phenyl - 3 - pyrazolone ($C_{19}H_{17}N_3O_3$; M.W. 335,350) gave the following results:

Calculated for CHN (percent): C=68.04; H=5.11; N=12.53. Found CHN (percent): C=68.02; H=5.04; N=12.43.

EXAMPLE 2

Preparation of the sodium salt of 2-carboxy - 1 - benzalimino - 1,5 - dimethyl - 2 - phenyl - 3 - pyrazolone, Formula I, [X+]=[Na+]

The reaction according to which the above compound is prepared as follows:

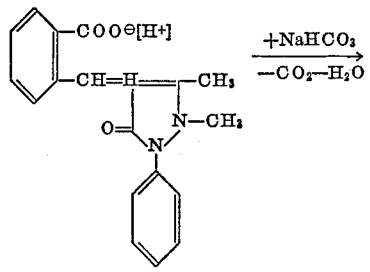

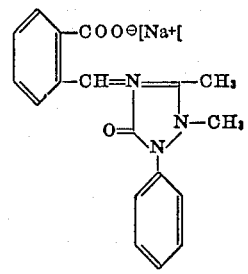

In particular, 3.35 g. of 2-carboxy - 1 - benzalimino-1,5 - dimethyl - 2 - phenyl - 3 - pyrazolone are suspended in 33 ml. of distilled water; the whole is heated at 45° while stirring. Separately, a solution of 0.84 g. of sodium bicarbonate dissolved in 5 ml. of distilled water is prepared. The sodium bicarbonate solution is slowly dropped in while stirring. After completion of the dropping a thorough solution of the 2-carboxy-1-benzalimino-1,5-dimethyl-2-phenyl-3-pyrazolone as the sodium salt is obtained.

Such a solution is concentrated under vacuum until a nearly 70% solution is obtained. Then three volumes of alcohol are added under stirring and the product sought precipitates as crystals.

Such a salt is fairly water soluble even in the cold. Like all the organic metallic compounds it does not exhibit a melting point.

From water solutions of the sodium salt of 2-carboxy-1 - benzalimino - 1,5 - dimethyl - 2 - phenyl - 3 - pyrazolone, by acidifying with acetic acid, the 2-carboxy-1-benzalimino - 1,5 - dimethyl - 2 - phenyl - 3 - pyrazolone (M.P. 184°–185° C.), precipitates out.

EXAMPLE 3

Preparation of the methylglucamine salt of 2-carboxy-1-benzalimino-1,5-dimethyl-2-phenyl-3-pyrazolone Said compound as previously stated can be represented by the Formula I wherein:

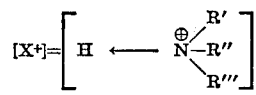

and

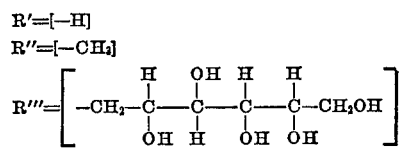

The preparation of such compound proceeds according to the following reaction scheme:

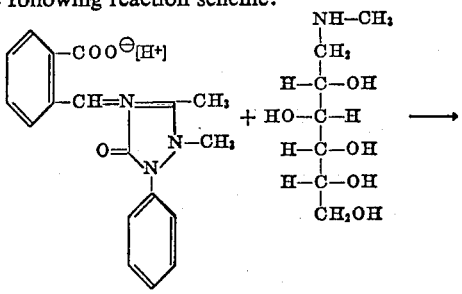

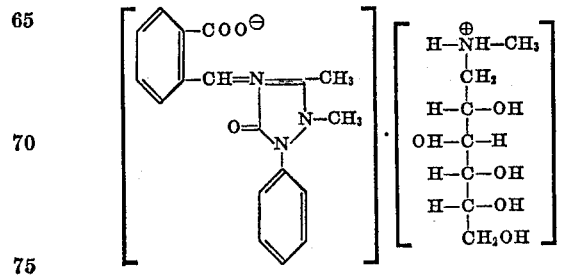

In particular, 3.35 g. of 2-carboxyl-1-benzalimino-1,5-dimethyl-2-phenyl-3-pyrazolone are suspended in 50 ml. of absolute ethyl alcohol. Under a vigorous stirring and at a temperature of 45° C., 1.95 g. of methylglucamine are slowly added portionwise.

The dropping must be very slow and the stirring quick in order to avoid maintaining the solution of the product in a high alkaline medium. After completion of the dropping, the whole is left under stirring for 1 hour while maintaining the temperature around 45° C., until a pale yellow colored thorough solution is obtained. The solution is hot filtered for removing the possible traces of unreacted product and then cooled in freezer for 24 hours. The methylglucamine salt of 2-carboxy-1-benzalimino-1,5-dimethyl-2-phenyl-3-pirazolone crystallizes out as yellow crystals; the material is filtered and dried under vacuum on $P_2O_5$. The recrystallized and thoroughly dry product has a M.P. of 83°–84° C.; is very hygroscopic and in the air it becomes immediately deliquescent.

It dissolves instantaneously both in water and in water-alcohol solutions. From such solutions by acidification with acetic acid the 2-carboxy-1-benzalimino-1,5-dimethyl-2-phenyl-3-pyrazolone (M.P. 184–185° C.) precipitates again.

By the method described, other quaternary ammonium salts of the product sought can be obtained and all have the feature of excellent water solubility.

Finally, the invention concerns also processes similar to the previous one for the preparation of organic salts of the compound of the Formula I wherein $X^+$ is as defined in the Formulas II–VI; the reaction components being present in equimolar amounts.

The present invention has been described in particular embodiments thereof, but it is understood that changes and alteration can be made therein without departing from the scope of the invention.

Having thus described the present invention, what is claimed is:

1. 2 - carboxy-1-benzalimino-1,5-dimethyl-2-phenyl-3-pyrazolone and salts thereof of the formula:

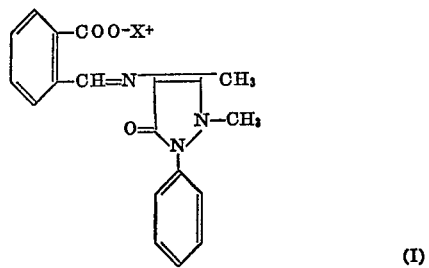

(I)

wherein $X^+$ is selected from the group consisting of
(a) $H^+$
(b) alkali and alkaline earth metals selected from Na, K, Ca, and Mg
(c) 

where:

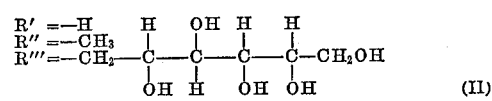

(II)

(d) 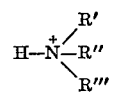

where:

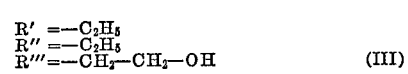

(III)

(e) 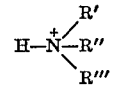

where:

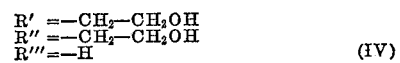

(IV)

(f) 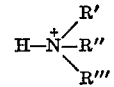

where:

(V)

(g) 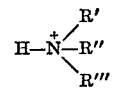

where:

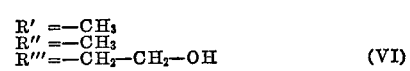

(VI)

References Cited
UNITED STATES PATENTS
1,151,885  8/1915  Kropp _____ 260—310 A
2,568,580  9/1951  Coleman _____ 260—240 G
2,620,273  12/1952 Jennen _____ 260—240 G X

OTHER REFERENCES

Erdos et al., Chemical Abstracts vol. 29, cols. 1816 to 1817 (1935).
Mattu, Gazz. Chim. Ital. vol. 81, pp. 891 to 895 (1951).
Ohashi et al., Chemical Abstracts vol. 54, col. 4544 (1960).

JOHN D. RANDOLPH, Primary Examiner

U.S. Cl. X.R.

424—273; 260—310 A